US012587867B2

(12) United States Patent
Isaac et al.

(10) Patent No.: US 12,587,867 B2
(45) Date of Patent: Mar. 24, 2026

(54) INTERFERENCE MANAGEMENT FOR DYNAMIC SPECTRUM SHARING

(71) Applicant: QUALCOMM Incorporated, San Diego, CA (US)

(72) Inventors: Reneeta Sara Isaac, Bangalore (IN); Shashidhar Vummintala, Bangalore (IN); Andrea Garavaglia, Nuremberg (DE); Ashok Mantravadi, San Diego, CA (US); Hari Sankar, San Diego, CA (US); Alexei Yurievitch Gorokhov, San Diego, CA (US); Hobin Kim, San Diego, CA (US); Jae Won Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 827 days.

(21) Appl. No.: 17/376,005

(22) Filed: Jul. 14, 2021

(65) Prior Publication Data

US 2023/0014069 A1     Jan. 19, 2023

(51) Int. Cl.
| | |
|---|---|
| *H04W 16/14* | (2009.01) |
| *H04B 17/318* | (2015.01) |
| *H04B 17/345* | (2015.01) |

(52) U.S. Cl.
CPC .......... *H04W 16/14* (2013.01); *H04B 17/318* (2015.01); *H04B 17/345* (2015.01)

(58) Field of Classification Search
CPC ..... H04W 16/14; H04W 16/10; H04W 16/06; H04W 72/541; H04W 72/0453; H04W 72/20; H04W 72/1215; H04W 72/048;

H04W 72/082; H04W 72/085; H04W 72/542; H04W 52/343; H04W 52/40; H04W 52/0206; H04W 52/16; H04W 52/241; H04W 52/325; H04W 52/143; H04W 52/262; H04W 52/281; H04W 28/18; H04W 84/12; H04W 84/18;
(Continued)

(56) References Cited

U.S. PATENT DOCUMENTS

| | | | | |
|---|---|---|---|---|
| 2009/0245331 A1* | 10/2009 | Palanki | ................. | H04W 52/32 |
| | | | | 375/E1.02 |
| 2010/0203858 A1* | 8/2010 | Lee | ...................... | H04B 7/0854 |
| | | | | 455/278.1 |

(Continued)

*Primary Examiner* — Un C Cho
*Assistant Examiner* — Rasha K Fayed
(74) *Attorney, Agent, or Firm* — Holland & Hart LLP

(57) ABSTRACT

Methods, systems, and devices for wireless communications are described. A user equipment (UE) may update a noise estimation (e.g., a noise covariance matrix, a log likelihood ratio (LLR) scaling, or both) for communications with a serving base station to account for interference from a neighboring base station operating according to a different radio access technology (RAT). For example, the UE may identify a transmission status of a base station operating according to a first RAT, such as long term evolution (LTE), that shares a radio frequency spectrum with a serving base station operating according to a second RAT, such as new radio (NR). The UE may measure the interference from the LTE base station and may update a noise estimation according to the measured interference. The UE and the serving base station may communicate based on the updated noise estimation.

18 Claims, 11 Drawing Sheets

(58) Field of Classification Search
CPC ..... H04W 88/06; H04W 88/08; H04W 74/00;
H04W 74/085; H04W 24/00; H04W
76/00; H04W 12/08; H04W 48/02; H04L
5/0035; H04L 63/00; H04B 1/10; H04B
1/0026; H04B 17/318; H04B 17/345;
H04B 17/24; H04B 7/022; H04B 7/0626;
Y02D 30/70
See application file for complete search history.

(56) References Cited

U.S. PATENT DOCUMENTS

| | | | | |
|---|---|---|---|---|
| 2013/0077657 A1* | 3/2013 | Wang | H04B 1/7107 | |
| | | | 375/E1.032 | |
| 2014/0051378 A1* | 2/2014 | Daneshrad | H04B 1/10 | |
| | | | 455/307 | |
| 2014/0160949 A1* | 6/2014 | Clausen | H04L 5/0073 | |
| | | | 370/252 | |
| 2014/0355708 A1* | 12/2014 | Kang | H04L 25/024 | |
| | | | 375/267 | |
| 2016/0277165 A1* | 9/2016 | Wei | H04L 5/0048 | |
| 2016/0380687 A1* | 12/2016 | Neuhaus | H04B 7/0626 | |
| | | | 370/252 | |
| 2017/0171758 A1* | 6/2017 | Li | H04W 72/0453 | |
| 2017/0230149 A1* | 8/2017 | Wang | H04L 1/1819 | |
| 2017/0373810 A1* | 12/2017 | Wang | H04W 4/022 | |
| 2018/0013522 A1* | 1/2018 | Liu | H04L 1/1854 | |
| 2018/0074184 A1* | 3/2018 | Feria | G01S 7/295 | |
| 2018/0083681 A1* | 3/2018 | Faxér | H04B 7/0479 | |
| 2018/0139615 A1* | 5/2018 | Cui | H04W 72/0453 | |
| 2019/0178985 A1* | 6/2019 | Roh | G01S 13/56 | |
| 2019/0223145 A1* | 7/2019 | Jung | H04W 76/27 | |
| 2020/0187025 A1* | 6/2020 | Agarwal | H04W 24/02 | |
| 2020/0260342 A1* | 8/2020 | Vaidya | H04W 36/362 | |
| 2020/0337054 A1* | 10/2020 | Kwok | H04W 48/18 | |
| 2021/0153262 A1* | 5/2021 | Mochizuki | H04W 74/0833 | |
| 2022/0077993 A1* | 3/2022 | Hong | H04W 72/20 | |
| 2022/0167176 A1* | 5/2022 | Khalid | H04W 72/0453 | |
| 2022/0183009 A1* | 6/2022 | Yu | H04W 16/10 | |
| 2022/0217019 A1* | 7/2022 | Levinbrook | H04L 5/0048 | |
| 2022/0322372 A1* | 10/2022 | Takeda | H04J 11/005 | |
| 2022/0329300 A1* | 10/2022 | Wang | H04W 24/10 | |
| 2022/0338208 A1* | 10/2022 | Chen | H04W 28/0967 | |
| 2022/0345240 A1* | 10/2022 | Chen | H04L 1/0002 | |
| 2022/0360998 A1* | 11/2022 | Park | H04L 5/005 | |
| 2023/0300009 A1* | 9/2023 | Li | H04L 25/08 | |
| | | | 375/285 | |

* cited by examiner

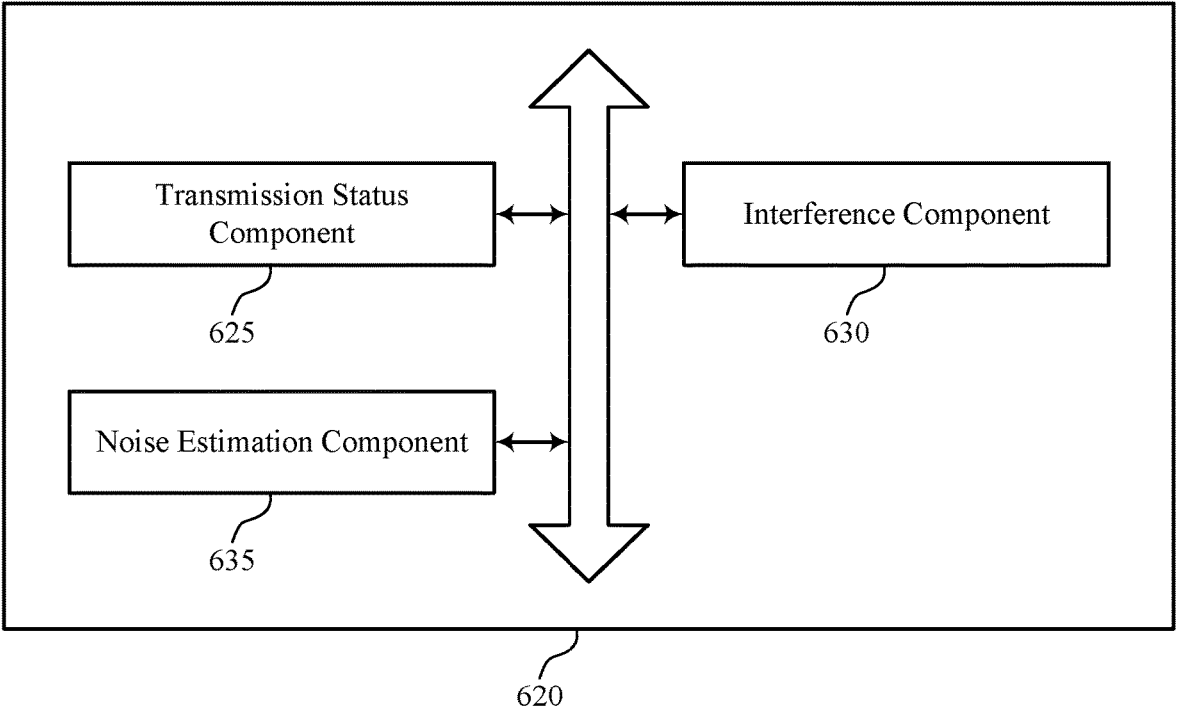
FIG. 6

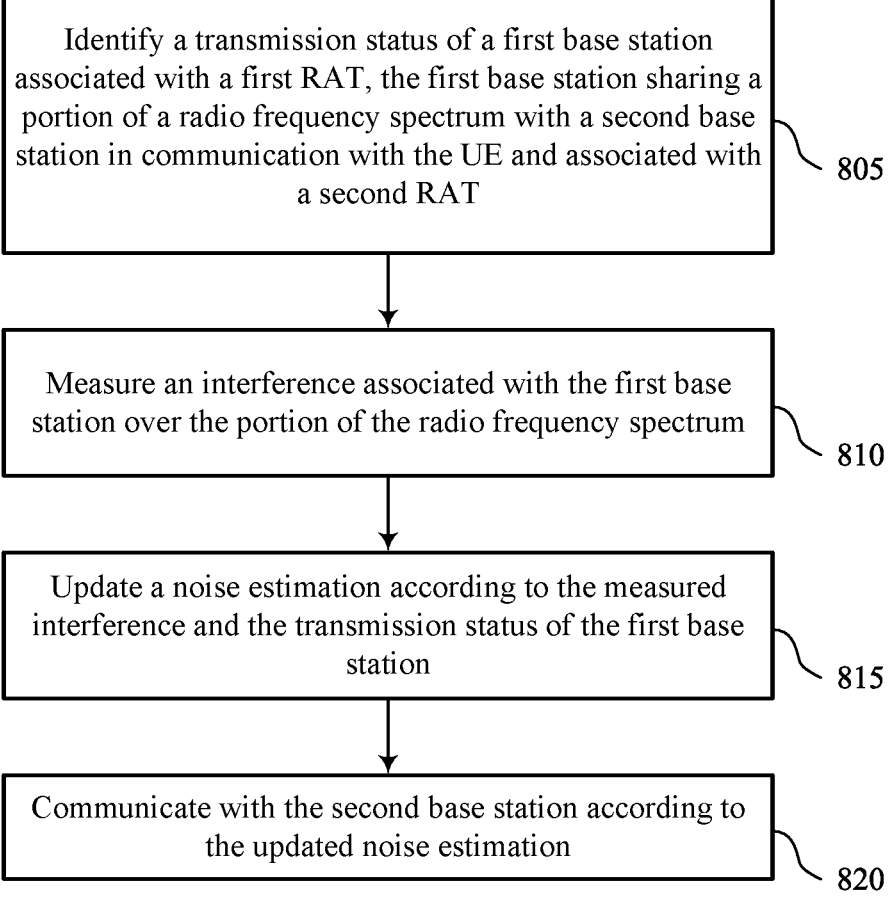

Identify a transmission status of a first base station associated with a first RAT, the first base station sharing a portion of a radio frequency spectrum with a second base station in communication with the UE and associated with a second RAT

805

Measure an interference associated with the first base station over the portion of the radio frequency spectrum

810

Update a noise estimation according to the measured interference and the transmission status of the first base station

815

Communicate with the second base station according to the updated noise estimation

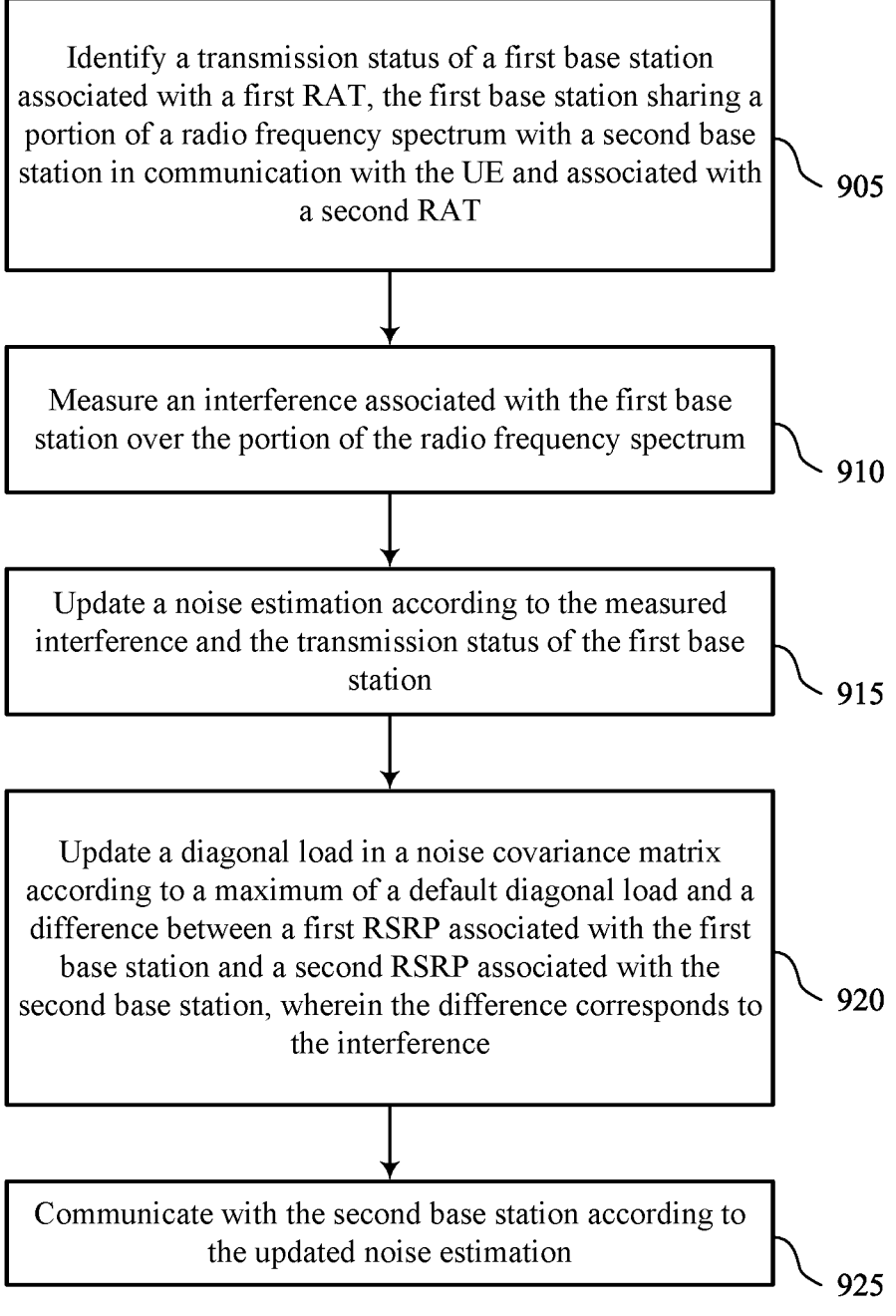

Identify a transmission status of a first base station associated with a first RAT, the first base station sharing a portion of a radio frequency spectrum with a second base station in communication with the UE and associated with a second RAT

905

Measure an interference associated with the first base station over the portion of the radio frequency spectrum

910

Update a noise estimation according to the measured interference and the transmission status of the first base station

915

Update a diagonal load in a noise covariance matrix according to a maximum of a default diagonal load and a difference between a first RSRP associated with the first base station and a second RSRP associated with the second base station, wherein the difference corresponds to the interference

920

Communicate with the second base station according to the updated noise estimation

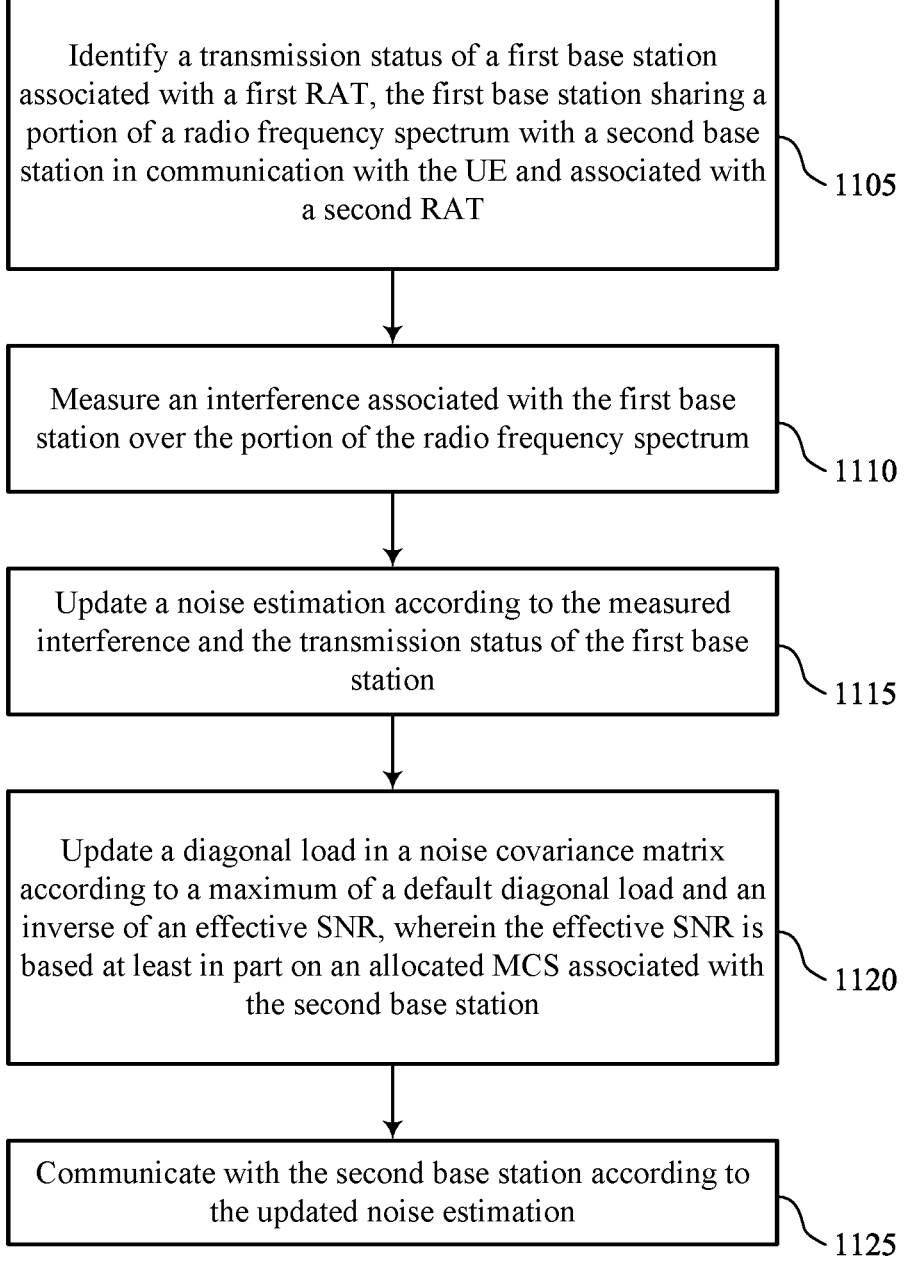

Identify a transmission status of a first base station associated with a first RAT, the first base station sharing a portion of a radio frequency spectrum with a second base station in communication with the UE and associated with a second RAT

1105

Measure an interference associated with the first base station over the portion of the radio frequency spectrum

1110

Update a noise estimation according to the measured interference and the transmission status of the first base station

1115

Update a diagonal load in a noise covariance matrix according to a maximum of a default diagonal load and an inverse of an effective SNR, wherein the effective SNR is based at least in part on an allocated MCS associated with the second base station

1120

Communicate with the second base station according to the updated noise estimation

INTERFERENCE MANAGEMENT FOR DYNAMIC SPECTRUM SHARING

FIELD OF TECHNOLOGY

The following relates to wireless communications, including interference management for dynamic spectrum sharing (DSS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support interference management for dynamic spectrum sharing (DSS). Generally, the described techniques provide for a user equipment (UE) to update a noise estimation (e.g., a noise covariance matrix, a log likelihood ratio (LLR) scaling, or both) for communications with a base station to account for interference from another base station operating according to a different radio access technology (RAT). For example, the UE may identify a transmission status, such as a loading status, of a first base station operating according to a first RAT, such as long term evolution (LTE), that shares a radio frequency spectrum with a second base station operating according to a second RAT, such as 5G new radio (NR). The UE may measure the interference from the first base station and may update a noise estimation according to the measured interference and the identified transmission status of the first base station. The UE and the second base station may communicate based on the updated noise estimation.

A method for wireless communications at a user equipment (UE) is described. The method may include identifying a transmission status of a first base station associated with a first RAT, the first base station sharing a portion of a radio frequency spectrum with a second base station in communication with the UE and associated with a second RAT, measuring an interference associated with the first base station over the portion of the radio frequency spectrum, updating a noise estimation according to the measured interference and the transmission status of the first base station, and communicating with the second base station according to the updated noise estimation.

An apparatus for wireless communications at a UE is described. The apparatus may include a processor, memory coupled with the processor, and instructions stored in the memory. The instructions may be executable by the processor to cause the apparatus to identify a transmission status of a first base station associated with a first RAT, the first base station sharing a portion of a radio frequency spectrum with a second base station in communication with the UE and associated with a second RAT, measure an interference associated with the first base station over the portion of the radio frequency spectrum, update a noise estimation according to the measured interference and the transmission status of the first base station, and communicate with the second base station according to the updated noise estimation.

Another apparatus for wireless communications at a UE is described. The apparatus may include means for identifying a transmission status of a first base station associated with a first RAT, the first base station sharing a portion of a radio frequency spectrum with a second base station in communication with the UE and associated with a second RAT, means for measuring an interference associated with the first base station over the portion of the radio frequency spectrum, means for updating a noise estimation according to the measured interference and the transmission status of the first base station, and means for communicating with the second base station according to the updated noise estimation.

A non-transitory computer-readable medium storing code for wireless communications at a UE is described. The code may include instructions executable by a processor to identify a transmission status of a first base station associated with a first RAT, the first base station sharing a portion of a radio frequency spectrum with a second base station in communication with the UE and associated with a second RAT, measure an interference associated with the first base station over the portion of the radio frequency spectrum, update a noise estimation according to the measured interference and the transmission status of the first base station, and communicate with the second base station according to the updated noise estimation.

In some examples of the method, apparatuses, and non-transitory computer-readable medium described herein, updating the noise estimation may include operations, features, means, or instructions for updating a diagonal load in a noise covariance matrix according to a maximum of a default diagonal load and a difference between a first reference signal received power (RSRP) associated with the first base station and a second RSRP associated with the second base station, where the difference corresponds to the interference.

Some examples of the method, apparatuses, and non-transitory computer-readable medium described herein may further include operations, features, means, or instructions for decreasing a log likelihood ratio (LLR) scaling for one or more resource elements associated with corresponding reference signals based on the difference.

Some examples of the method, apparatuses, and non-transitory computer-readable medium described herein may further include operations, features, means, or instructions for maintaining a diagonal load in a noise covariance matrix and decreasing an LLR scaling for one or more resource elements associated with corresponding reference signals based on a difference between a first RSRP associated with the first base station and a second RSRP associated with the second base station, where the difference corresponds to the interference.

In some examples of the method, apparatuses, and non-transitory computer-readable medium described herein, the LLR scaling may be decreased by an amount that may be based on a threshold interference associated with the LLR scaling.

In some examples of the method, apparatuses, and non-transitory computer-readable medium described herein, updating the noise estimation may include operations, features, means, or instructions for updating a diagonal load in a noise covariance matrix according to a maximum of a default diagonal load and an inverse of an effective signal-to-noise ratio (SNR), where the effective SNR may be based on an allocated modulation and coding scheme (MCS) associated with the second base station.

Some examples of the method, apparatuses, and non-transitory computer-readable medium described herein may further include operations, features, means, or instructions for performing, on the portion of the radio frequency spectrum, a cell search procedure and one or more measurements corresponding to the first base station, where identifying the transmission status of the first base station may be based on the cell search procedure and performing one or more additional measurements corresponding to the first base station.

In some examples of the method, apparatuses, and non-transitory computer-readable medium described herein, the one or more additional measurements include channel measurements or signal strength measurements of the first base station.

In some examples of the method, apparatuses, and non-transitory computer-readable medium described herein, identifying the transmission status may include operations, features, means, or instructions for determining first decoding statistics for a reference signal and second decoding statistics for a data transmission, the first decoding statistics and the second decoding statistics including one or more of a block error rate (BLER) or a decoding iteration count corresponding to a code block and comparing a difference between the first decoding statistics and the second decoding statistics to determine a presence of a time-localized impact, where the transmission status corresponds to the presence of the time-localized impact.

In some examples of the method, apparatuses, and non-transitory computer-readable medium described herein, the interference includes reference signal interference.

A method for wireless communications at a UE is described. The method may include identifying a transmission status of a first base station associated with a first RAT, the first base station sharing a portion of a radio frequency spectrum with a second base station in communication with the UE and associated with a second RAT, measuring an interference associated with the first base station over the portion of the radio frequency spectrum, updating a noise estimation according to the measured interference and the transmission status of the first base station, and communicating with the second base station according to the updated noise estimation.

An apparatus for wireless communications at a UE is described. The apparatus may include a processor, memory coupled with the processor, and instructions stored in the memory. The instructions may be executable by the processor to cause the apparatus to identify a transmission status of a first base station associated with a first RAT, the first base station sharing a portion of a radio frequency spectrum with a second base station in communication with the UE and associated with a second RAT, measure an interference associated with the first base station over the portion of the radio frequency spectrum, update a noise estimation according to the measured interference and the transmission status of the first base station, and communicate with the second base station according to the updated noise estimation.

Another apparatus for wireless communications at a UE is described. The apparatus may include means for identifying a transmission status of a first base station associated with a first RAT, the first base station sharing a portion of a radio frequency spectrum with a second base station in communication with the UE and associated with a second RAT, means for measuring an interference associated with the first base station over the portion of the radio frequency spectrum, means for updating a noise estimation according to the measured interference and the transmission status of the first base station, and means for communicating with the second base station according to the updated noise estimation.

A non-transitory computer-readable medium storing code for wireless communications at a UE is described. The code may include instructions executable by a processor to identify a transmission status of a first base station associated with a first RAT, the first base station sharing a portion of a radio frequency spectrum with a second base station in communication with the UE and associated with a second RAT, measure an interference associated with the first base station over the portion of the radio frequency spectrum, update a noise estimation according to the measured interference and the transmission status of the first base station, and communicate with the second base station according to the updated noise estimation.

Some examples of the method, apparatuses, and non-transitory computer-readable medium described herein may further include operations, features, means, or instructions for update a diagonal load in a noise covariance matrix according to a maximum of a default diagonal load and a difference between a first RSRP associated with the first base station and a second RSRP associated with the second base station, where the difference corresponds to the interference.

Some examples of the method, apparatuses, and non-transitory computer-readable medium described herein may further include operations, features, means, or instructions for decrease an LLR scaling for one or more resource elements associated with corresponding reference signals based on the difference.

Some examples of the method, apparatuses, and non-transitory computer-readable medium described herein may further include operations, features, means, or instructions for maintain a diagonal load in a noise covariance matrix and decrease an LLR scaling for one or more resource elements associated with corresponding reference signals based on a difference between a first RSRP associated with the first base station and a second RSRP associated with the second base station, where the difference corresponds to the interference.

In some examples of the method, apparatuses, and non-transitory computer-readable medium described herein, the LLR scaling may be decreased by an amount that may be based on a threshold interference associated with the LLR scaling.

Some examples of the method, apparatuses, and non-transitory computer-readable medium described herein may further include operations, features, means, or instructions for update a diagonal load in a noise covariance matrix according to a maximum of a default diagonal load and an inverse of an effective SNR, where the effective SNR may be based on an allocated MCS associated with the second base station.

Some examples of the method, apparatuses, and non-transitory computer-readable medium described herein may further include operations, features, means, or instructions for perform, on the portion of the radio frequency spectrum, a cell search procedure and one or more measurements corresponding to the first base station, where identifying the transmission status of the first base station may be based on the cell search procedure and performing one or more additional measurements corresponding to the first base station.

In some examples of the method, apparatuses, and non-transitory computer-readable medium described herein, the one or more additional measurements include channel measurements or signal strength measurements of the first base station.

In some examples of the method, apparatuses, and non-transitory computer-readable medium described herein, identifying the transmission status may include operations, features, means, or instructions for determining first decoding statistics for a reference signal and second decoding statistics for a data transmission, the first decoding statistics and the second decoding statistics including one or more of a BLER or a decoding iteration count corresponding to a code block and compare a difference between the first decoding statistics and the second decoding statistics to determine a presence of a time-localized impact, where the transmission status corresponds to the presence of the time-localized impact.

A method for wireless communications at a UE is described. The method may include identifying a transmission status of a first base station associated with a first RAT, the first base station sharing a portion of a radio frequency spectrum with a second base station in communication with the UE and associated with a second RAT, measuring an interference associated with the first base station over the portion of the radio frequency spectrum, updating a noise estimation according to the measured interference and the transmission status of the first base station, and communicating with the second base station according to the updated noise estimation.

An apparatus for wireless communications at a UE is described. The apparatus may include a processor, memory coupled with the processor, and instructions stored in the memory. The instructions may be executable by the processor to cause the apparatus to identify a transmission status of a first base station associated with a first RAT, the first base station sharing a portion of a radio frequency spectrum with a second base station in communication with the UE and associated with a second RAT, measure an interference associated with the first base station over the portion of the radio frequency spectrum, update a noise estimation according to the measured interference and the transmission status of the first base station, and communicate with the second base station according to the updated noise estimation.

Another apparatus for wireless communications at a UE is described. The apparatus may include means for identifying a transmission status of a first base station associated with a first RAT, the first base station sharing a portion of a radio frequency spectrum with a second base station in communication with the UE and associated with a second RAT, means for measuring an interference associated with the first base station over the portion of the radio frequency spectrum, means for updating a noise estimation according to the measured interference and the transmission status of the first base station, and means for communicating with the second base station according to the updated noise estimation.

A non-transitory computer-readable medium storing code for wireless communications at a UE is described. The code may include instructions executable by a processor to identify a transmission status of a first base station associated with a first RAT, the first base station sharing a portion of a radio frequency spectrum with a second base station in communication with the UE and associated with a second RAT, measure an interference associated with the first base station over the portion of the radio frequency spectrum, update a noise estimation according to the measured interference and the transmission status of the first base station, and communicate with the second base station according to the updated noise estimation.

BRIEF DESCRIPTION OF THE DRAWINGS

FIG. 6 shows a block diagram of a communications manager that supports interference management for DSS in accordance with aspects of the present disclosure.

FIGS. 8 through 11 show flowcharts illustrating methods that support interference management for DSS in accordance with aspects of the present disclosure.

DETAILED DESCRIPTION

Figure 1:
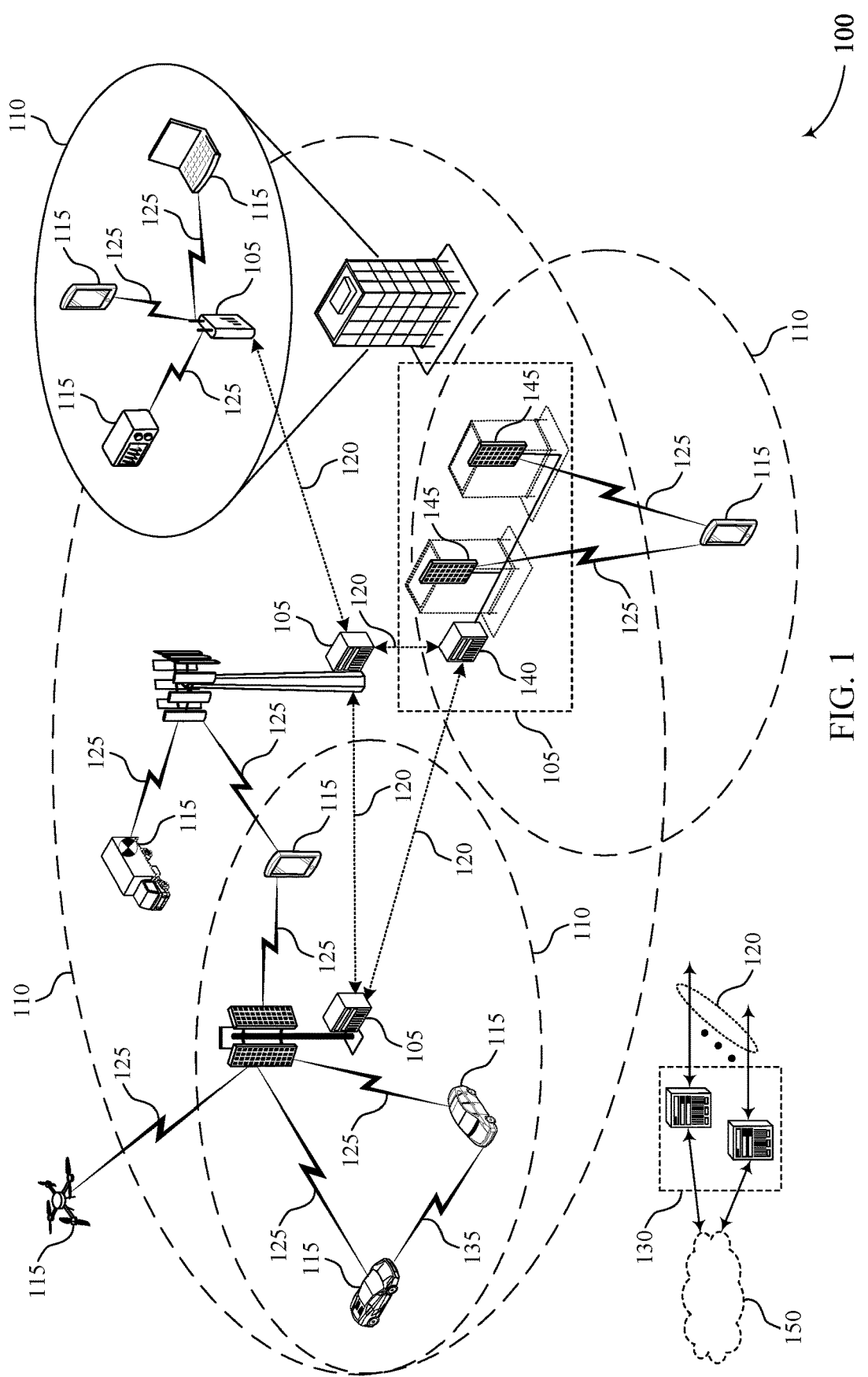
FIGS. 1 and 2 illustrate examples of wireless communications systems that support interference management for dynamic spectrum sharing (DSS) in accordance with aspects of the present disclosure.

In some wireless communications systems, a user equipment (UE) may communicate control signaling, data, or both, with a base station using a frequency band. In some cases, multiple radio access technologies (RATs) may share a same frequency band, which may be referred to as dynamic spectrum sharing (DSS). In DSS systems, such as where long term evolution (LTE) communication and new radio (NR) communication coexists, downlink throughput may not be equal for the different RATs at a similar reference signal received power (RSRP) (e.g., due to cell reference signal (CRS) rate matching overhead differences and the absence of a CRS interference cancellation (CRS-IC) algorithm in NR). In some examples, a cell or a base station operating according to a first RAT, such as LTE, may be loaded (e.g., transmitting data) or unloaded (e.g., transmitting reference signals). A UE may capture interference of a transmission from the LTE base station based on interference on a cell or base station for a second RAT, such as an NR base station. However, the UE may be unable to detect interference (e.g., using a demodulation reference signal (DMRS)) if the neighboring base station of the first RAT is unloaded (e.g., transmitting reference signals). Because the UE may not identify the interference, the UE may not account for the interference when communicating a data transmission with the base station of the second RAT. Further, the UE may not update a noise estimation according to the interference for the neighboring base station (e.g., for loaded or unloaded neighboring base stations).

In some examples, a UE may identify interference from a neighboring cell or base station. For example, the UE may detect a time-localized impact of an unloaded neighboring base station operating according to a first RAT, such as LTE. In some other examples, the UE may perform a cell search procedure and one or more measurements to detect a data transmission from a loaded neighboring base station. If the UE detects a loaded or unloaded neighboring base station, the UE may measure interference from the neighboring base station. The UE may modify a diagonal load in a noise covariance matrix, which may represent channel noise and variance across the channel for a serving base station operating according to a second RAT, such as NR. Additionally or alternatively, the UE may adjust a log likelihood ratio (LLR) scaling based on the measured interference. That is, the UE may update a noise estimation based on the measured interference from the neighboring base station. In some examples, the UE may communicate with the serving base station after updating the noise estimation.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to interference management for DSS.

FIG. 1 illustrates an example of a wireless communications system 100 that supports interference management for DSS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lowerpowered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more critical services such as critical push-to-talk (PTT), critical video, or critical data. Support for critical functions may include prioritization of services, and critical services may be used for public safety or general commercial applications. The terms ultra-reliable, low-latency, critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may transmit a data transmission to a UE 115, in which case the base station 105 may be referred to as a loaded base station 105. In some other cases, a base station 105 may transmit one or more reference signals to a UE 115, in which case the base station 105 may be referred to as an unloaded base station 105. One or more base stations 105 may operate according to different RATs and may share a frequency spectrum across RATs, which may be referred to as DSS (e.g., where LTE and NR coexist). In some cases, if a neighboring LTE base station 105 is loaded, interference may be captured by a DMRS from an NR base station 105. However, if an LTE neighboring base station 105 is unloaded, interference may not be captured by a DMRS, as DMRS may not be interfered by an LTE reference signal. Because the UE 115 may not identify the interference from an LTE base station 105, the UE 115 may not account for the interference when communicating a data transmission with an NR base station 105. Further, the UE 115 may not update a noise estimation according to the interference for the neighboring base station 105 (e.g., for loaded or unloaded neighboring base stations 105).

In some examples, a UE 115 may account for interference from neighboring base stations 105 operating according to different RATs than a serving base station 105 and sharing a frequency spectrum with a serving base station 105. In some examples, the UE 115 may identify the presence of interference from a neighboring base station 105, which may be an LTE base station 105, based on triggering an LTE search and channel measurement or identifying a time-localized impact. In some cases, the UE 115 may quantify the interference by measuring or computing a noise covariance on one or more CRS symbols. The UE 115 may update a noise estimation based on measured interference from an LTE base station 105. Updating the noise estimation may include modifying a diagonal load of a noise covariance matrix, adjusting an LLR scaling, or both. The UE 115 and a serving base station 105, such as an NR base station 105, may communicate based on updating the noise estimation.

Figure 2:
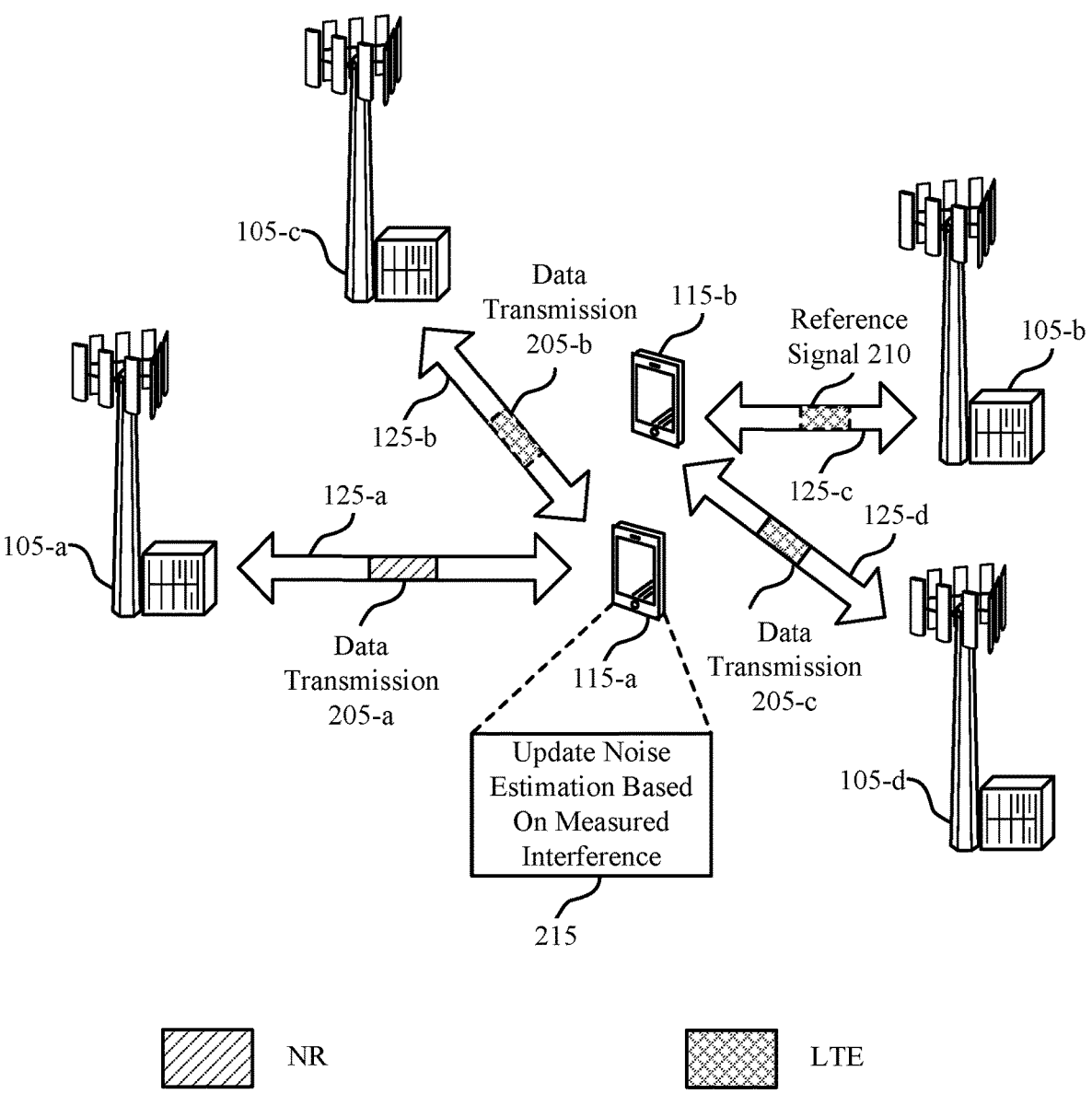

FIG. 2 illustrates an example of a wireless communications system 200 that supports interference management for DSS in accordance with aspects of the present disclosure. In some examples, wireless communications system 200 may implement aspects of wireless communications system 100 and may include a UE 115-a, a UE 115-b, a base station 105-a, a base station 105-b, a base station 105-c, and a base station 105-d, which may be examples of UEs 115 and base stations 105 as described with reference to FIG. 1. In some examples, the base stations 105 and UEs 115 may communicate control information, data, or both using a communication link 125. For example, base station 105-a may communicate a data transmission 205 with UE 115-a via communication link 125-a based on UE 115-a accounting for interference from an unloaded neighboring base station, such as base station 105-b.

In some cases, a base station 105 may transmit data 205 to a UE 115, in which case the base station 105 may be referred to as a loaded base station 105. For example, base station 105-a may transmit data 205-a to UE 115-a via communication link 125-a, thus base station 105-a may be a loaded base station 105. Similarly, base station 105-c may transmit data 205-b to UE 115-a via communication link 125-b, thus base station 105-c may be a loaded base station 105. In some other cases, a base station 105 may transmit one or more reference signals 210 to a UE 115, in which case the base station 105 may be referred to as an unloaded base station 105. For example, base station 105-b may transmit one or more reference signals 210 to UE 115-b via communication link 125-c, thus base station 105-b may be an unloaded base station 105.

In some examples, one or more base stations 105 may operate according to different RATs. For example, base station 105-a may be an NR base station 105, while base station 105-b, base station 105-c, and base station 105-d may be LTE base stations 105. In some cases, the base stations 105 may share a frequency spectrum across RATs, which may be referred to as DSS (e.g., where LTE and NR coexist). In some cases, downlink throughput may be different for each RAT. That is, NR downlink throughput may be lower than that of LTE at similar RSRPs. The downlink throughput may be different due to a RAT having higher overhead due to CRS rate matching. For example, for a set of DMRS parameters (e.g., DMRS Type 1, DMRS TypeA position equal to 2, DMRS additional position equal to 1, and a PDSCH length of 12), NR throughput may be lower than LTE by a percentage (e.g., by 9% or 10% if a number of LTE CRS ports are 2 or 4, respectively).

Additionally or alternatively, the downlink throughput may be different due to absence of CRS interference cancellation (CRS-IC) for one or more of the RATs. For example, NR may not have a CRS-IC algorithm for accounting for reference signal interference from a neighboring base station 105. Thus, although both NR and LTE base stations 105 may be affected by interference of LTE neighbors, a UE 115 communicating with an LTE base station 105 may cancel out interference due to CRS from neighboring base stations 105 through a CRS-IC algorithm, while the UE 115 may not for an NR base station 105. Because the UE 115 may not identify the interference from an LTE base station 105, the UE 115 may not account for the interference when communicating a data transmission with an NR base station 105. Further, the UE 115 may not update a noise estimation according to the interference for the neighboring base station 105 (e.g., for an unloaded neighboring base stations 105).

For example, a UE 115, such as UE 115-a, may be served by an NR base station 105-a that dynamically shares frequency spectrum with an LTE base station 105-c. The UE 115 may be aware of the LTE base station 105-c and may rate match around one or more CRSs from base station 105-c. However, the NR data reception may be impacted due to interference from a CRS from an unloaded neighbor LTE base station 105-b.

In some examples, a UE 115 may account for interference from neighboring base stations 105 operating according to different RATs than a serving base station 105 and sharing a frequency spectrum with a serving base station 105. For example, at 215, UE 115-a may update a noise estimation based on measured interference from base station 105-b. In some cases, UE 115-a may improve transmission performance for data 205-a by accounting for the presence of unloaded neighboring base station 105, such as base station 105-b, operating according to a different RAT than a serving base station 105, such as base station 105-a. UE 115-a may update a noise covariance, or noise covariance matrix, $R_{nn}$, on the symbols corresponding to base station 105-b (e.g., the LTE CRS symbols). That is, UE 115-a may use an updated $R_{nn}$ on one or more symbols (e.g., in time) that may be interfered by base station 105-b. The one or more symbols may be included in a slot, which may be a time interval for transmitting one or more reference signals, a data transmission, or the like.

In some cases, if a neighboring LTE base station 105 is loaded (e.g., transmitting data 205), interference may be captured by a DMRS from an NR base station 105. For example, UE 115-a may capture interference from the transmission of data 205-c between base station 105-d, which may be an LTE base station 105, and UE 115-b via communication link 125-d based on a DMRS from base station 105-a. Since the DMRS (e.g., from an NR base station 105-a) may be interfered by a neighbor LTE downlink shared channel (e.g., physical downlink shared channel (PDSCH) from 105-d), the default noise estimation at UE 115-a, which is based on DMRS, may capture the interference directly. However, if an LTE neighboring base station 105 is unloaded (e.g., transmitting a reference signal 210), interference may not be captured by a DMRS, as DMRS may not be interfered by an LTE reference signal. However, an NR downlink shared channel (e.g., PDSCH) may be impacted by the LTE reference signal. Thus, UE 115-a may need to detect the presence of interference and quantify the interference through other methods.

In some cases, UE 115-a may update noise covariance, which may be related to a width of a communication channel, based on the impacted symbols (e.g., LTE CRS symbols). For example, if UE 115-*a* detects an LTE neighbor base station 105, such as base station 105-*b*, UE 115-*a* may modify a diagonal load in $R_{nn}$ as a maximum of a default diagonal load, which may be the noise in a received DMRS ($DMRS_{noise}$), and a function of RSRP max ($DMRS_{noise}$, f(RSRPs)). In some cases, UE 115-*a* may determine f(RSRPs) according to Equation 1:

$$f(RSRPs) = LTE_{Neighbor}^{RSRP}(\text{dB}) - NR_{Serving}^{RSRP}(\text{dB})$$

where $$LTE_{Neighbor}^{RSRP}$$

is an RSRP of a neighboring LTE base station 105 (e.g., base station 105-*b*) and $$NR_{Serving}^{RSRP}$$

is an RSRP of a serving NR base station 105 (e.g., base station 105-*a*).

In some examples, UE 115-*a* may identify the presence of unloaded interference (e.g., from unloaded base station 105-*b*) or interference localized to one or more symbols (e.g., LTE CRS symbols). For example, UE 115-*a* may perform an LTE cell search and measurement on a same carrier frequency. In some cases, UE 115-*a* may decimate one or more receiver samples (e.g., narrowband receiver samples) to match an LTE sampling rate (e.g., 1.92 Megahertz (MHz)) and trigger an LTE search and channel measurement. Additionally or alternatively, UE 115-*a* may trigger a radio frequency to time division buffer path and may use the path for an LTE search and channel measurement. UE 115-*a* may identify unloaded interference from the reference signal 210 from UE 115-*b* based on triggering the LTE search and channel measurement.

In some other examples, UE 115-*a* may identify a time-localized impact to identify the presence of unloaded interference. UE 115-*a* may collect code block (CB) block error ratio (BLER) or iteration counts and may sort them according to a per symbol (e.g., OFDM symbol) BLER or iteration statistic. In some cases, UE 115-*a* may identify a delta value between a CRS symbol BLER ($CRS_{BLER}$) or iteration ($CRS_{ITER}$) and a non-CRS symbol BLER (Non-$CRS_{BLER}$) or iteration (Non-$CRS_{ITER}$). For example, if $CRS_{BLER} \geq k$Non-$CRS_{BLER}$ or $CRS_{ITER} \geq k$Non-$CRS_{ITER}$, where $k \geq 1$ is a real number, then UE 115-*a* may declare a presence of time-localized impact based on a presence of unloaded LTE neighbor base station 105-*b*. In some examples, if UE 115-*a* does not identify a delta value, UE 115-*a* may refrain from declaring a presence of an unloaded neighbor base station 105.

In some examples, once UE 115-*a* identifies a neighboring unloaded LTE base station 105, such as base station 105-*b* or one or more interfered symbols (e.g., from base station 105-*b*), UE 115-*a* may quantify the interference. Quantifying the interference may include UE 115-*a* measuring a noise covariance on one or more CRS symbols (e.g., localized in time) relative to the rest of a slot. In some cases, if UE 115-*a* triggers a search and measurement of the LTE base station 105, UE 115-*a* may compute the noise covariance according to Equation 1. In some examples, UE 115-*a* may calculate the delta in Equation 1 according to a threshold RSRP for the LTE neighboring base station 105 and the NR serving base station 105. For example, to reduce the impact of inaccuracy related to sample measurements, UE 115-*a* may implement a 20 dB threshold for the RSRPs.

In some other examples, once UE 115-*a* identifies a neighboring unloaded LTE base station 105 (e.g., detected based on cell search and measurements or based on time-localized impact), UE 115-*a* may compute a noise covariance as a maximum of $DMRS_{noise}$ and a function of modulation and coding scheme (MCS) (max ($DMRS_{noise}$, g(MCS)). In some cases, UE 115-*a* may determine g(MCS) as an inverse of an effective SNR, which may be projected using information from an allocated grant. UE 115-*a* may calculate an effective SNR based on the allocated MCS and according to Equation 2:

$$SNR_{eff}(\text{dB}) = 10 \log_{10}(2^{SPEF_{alloc}} - 1) + \Delta_{bias}(\text{rank,RxAntenna\_corr})$$

where $SPEF_{alloc}$ may be a per layer allocated spectral efficiency based on allocated MCS and $\Delta_{bias}$ is a bias factor that may be a function of a rank and channel correlation. In some examples, UE 115-*a* may calculate the SNR according to Equation 2 if outer loop link adaptation (OLLA) is enabled at the network side.

In some examples, UE 115-*a* may update the noise estimation based on quantifying the noise from one or more neighboring base stations 105. For example, UE 115-*a* may update a noise estimation at 215 based on noise from base station 105-*b*, base station 105-*d*, or both. In some cases, UE 115-*a* may modify a diagonal load in $R_{nn}$ to a maximum of $DMRS_{noise}$ and $Diagload_{intf}$(max($DMRS_{noise}$, $Diagload_{intf}$)) on CRS symbols, where $Diagload_{intf}$ is either a function of serving and neighbor RSRPs or a function of MCS allocated to UE 115-*a* (e.g., f(RSRP) or g(MCS)). In some other cases, UE 115-*a* may keep the diagonal load in $R_{nn}$ unchanged on non-CRS symbols. In some cases, UE 115-*a* may trigger the noise estimation twice in every slot, each time with different diagonal load terms. UE 115-*a* may maintain multiple whitening buffers (e.g., one for CRS symbols and another for non-CRS symbols).

Additionally or alternatively, UE 115-*a* may update the noise estimation based on updating an LLR scaling (e.g., gamma scale) on CRS symbols. For example, UE 115-*a* may reduce the LLR scaling to a lower value based on a delta in the noise covariance on CRS and non-CRS symbols. In some cases, UE 115-*a* may calculate the gamma scale on CRS symbols according to Equation 3:

$$\min\left(8, \max\left(1, \text{round}\left(\frac{8}{\frac{CRS_{noise}}{nonCRS_{noise}}}\right)\right)\right)$$

where $CRS_{noise}(\text{dB}) - nonCRS_{noise}(\text{dB}) = LTE_{intf}(\text{dB})$. The gamma scale on non-CRS symbols may remain the same (e.g., default gamma scale=8). Updating the LLR scaling may reduce additional noise estimation computations and may not use additional memory.

In some other examples, when the ratio of $$\frac{CRS_{noise}}{non-CRS_{noise}}$$

is greater than a threshold $$\left( \text{e.g., when round} \left( \frac{8}{\frac{CRS_{noise}}{non-CRS_{noise}}} \right) = 0 \right),$$

UE 115-$a$ may modify the diagonal load in the $R_{nn}$. For example, UE 115-$a$ may modify the diagonal load to max (DMRS$_{noise}$, new diagonal load), where the new diagonal load is the CRS$_{noise}$(dB)–X and X is a defined value of maximum interference UE 115-$a$ may handle with the gamma scale, such as 12 dB. The change in $R_{nn}$ may be for each symbol and may be enabled at relatively high SNRs (e.g., where there may be losses).

In some examples, UE 115-$a$ may perform a cell search and measurement on a same carrier frequency, may compute the noise covariance according to max (DMRS$_{noise}$, f(RSRPs)), and may modify the diagonal load in $R_{nn}$ on CRS symbols. In some other examples, UE 115-$a$ may identify a time-localized impact of interference from an unloaded neighboring base station 105 (e.g., with k≥1 in CRS$_{BLER}$≥k (Non-CRS$_{BLER}$) or CRS$_{ITER}$≥k(Non-CRS$_{ITER}$)), may compute the noise covariance according to max (DMRS$_{noise}$, g(MCS)), and may modify the diagonal load in $R_{nn}$ on CRS symbols. Additionally or alternatively, UE 115-$a$ may identify a time-localized impact of interference from an unloaded neighboring base station 105 (e.g., with k≥1 in CRS$_{BLER}$≥k(Non-CRS$_{BLER}$) or CRS$_{ITER}$≥k(Non-CRS$_{ITER}$)), may compute the noise covariance according to max (DMRS$_{noise}$, g(MCS)), and may update the LLR scaling on CRS symbols.

In some examples, by modifying the diagonal load in $R_{nn}$ on symbols impacted by unloaded LTE neighboring base stations 105, the performance of NR may be improved. UE 115-$a$ may identify the presence of interference on one or more symbols using CB-level iterations, BLER statistics, or both even without triggering an LTE search and measurement. UE 115-$a$ may quantify the amount of interference using allocated grant information even without LTE neighbor measurements.

In some examples, base station 105-$a$ and UE 115-$a$ may communicate data 205-$a$ based on updating the noise estimation at 215. For example, base station 105-$a$ may transmit data 205-$a$ to UE 115-$a$ while accounting for interference from the transmission of data 205-$c$ and the reference signal 210. In some other examples, UE 115-$a$ may transmit the data 205-$a$ to base station 105-$a$ while accounting for the interference from the transmission of data 205-$c$ and the reference signal 210.

Figure 3:
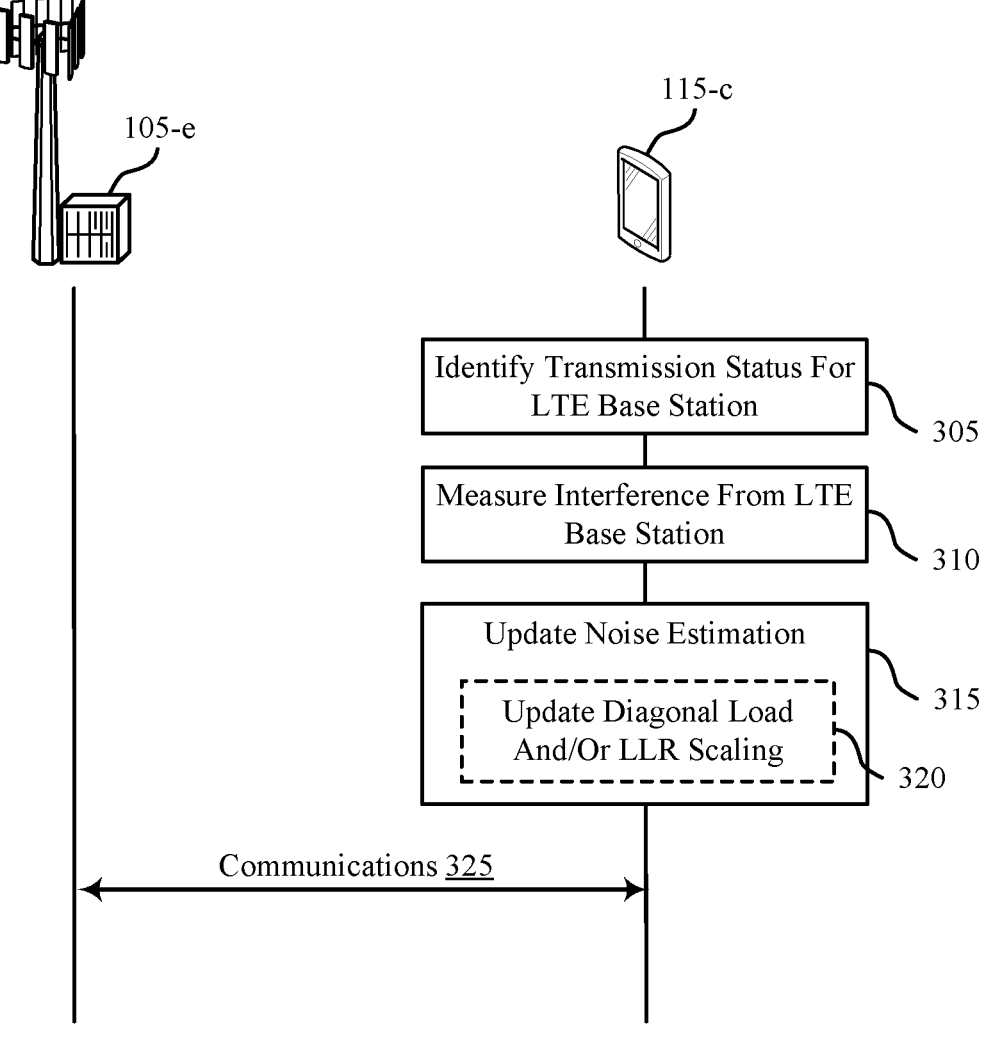
FIG. 3 illustrates an example of a process flow that supports interference management for DSS in accordance with aspects of the present disclosure.

FIG. 3 illustrates an example of a process flow 300 that supports interference management for DSS in accordance with aspects of the present disclosure. In some examples, process flow 300 may implement aspects of wireless communications system 100 and wireless communications system 200. The process flow 300 may illustrate an example of a UE 115-$c$ updating a noise estimation to account for interference from neighboring LTE base stations 105 for communications with an NR base station 105, such as base station 105-$e$. Alternative examples of the following may be implemented, where some processes are performed in a different order than described or are not performed. In some cases, processes may include additional features not mentioned below, or further processes may be added.

In some examples, a base station 105 operating according to a RAT may share a frequency spectrum with another base station of a different RAT, which may be referred to as DSS. For example, base station 105-$e$ may be an NR base station 105 and may share a frequency spectrum with one or more neighboring base stations 105, which may include LTE base stations 105.

At 305, UE 115-$c$ may identify a transmission status of a base station 105 operating according to a first RAT, such as LTE. The base station 105 may share a portion of a radio frequency spectrum with base station 105-$e$, which may operate according to a second RAT, such as NR. In some examples, UE 115-$c$ may perform a cell search procedure and one or more channel measurements on the portion of the radio frequency spectrum for the base station 105 operating according to the first RAT. UE 115-$c$ may identify the transmission status based on the cell search procedure and one or more additional measurements. The one or more additional measurements may include channel measurements or signal strength measurements of the base station 105 (e.g., the LTE base station 105).

In some other examples, UE 115-$c$ may determine decoding statistics for a reference signal and decoding statistics for a data transmission. The decoding statistics may include one or more of a BLER or a decoding iteration count for a CB. In some cases, UE 115-$c$ may compare a difference between the decoding statistics to determine a presence of a time-localized impact. The transmission status may be based on the presence of the time-localized impact.

At 310, UE 115-$c$ may measure an interference from the base station 105 operating according to the first RAT over the portion of the radio frequency spectrum. For example, UE 115-$c$ may measure interference from an LTE base station on one or more symbols, such as CRS symbols. The base station 105 may be an unloaded base station 105 (e.g., transmitting reference signals) or a loaded base station 105 (e.g., transmitting data). The Interference may include reference signal interference (e.g., from an unloaded base station 105).

At 315, UE 115-$c$ may update a noise estimation based on the measured interference and the transmission status of the base station 105 operating according to the first RAT.

For example, at 320, UE 115-$c$ may update a diagonal load of a noise covariance matrix, an LLR scaling, or both. In some cases, UE 115-$c$ may update a diagonal load in a noise covariance matrix according to a maximum of a default diagonal load and a difference between an RSRP of the base station 105 operating according to the first RAT (e.g., the LTE base station 105) and an RSRP of base station 105-$e$. The interference may be based on the difference (e.g., may include the difference). UE 115-$c$ may decrease an LLR scaling for one or more resource elements carrying reference signals based on the difference.

In some examples, UE 115-$c$ may maintain a diagonal load in a noise covariance matrix and may decrease an LLR scaling for one or more resource elements carrying reference signals based on the difference between RSRPs. The LLR scaling may be decreased by an amount based on a threshold interference for the LLR scaling.

In some other examples, UE 115-$c$ may update a diagonal load in a noise covariance matrix according to a maximum of a default diagonal load and an inverse of an effective SNR. The effective SNR may be based on an allocated MCS associated with base station 105-$e$.

At 325, UE 115-$c$ may communicate with base station 105-$e$ (e.g., the base station 105 operating according to the second RAT) based on the updated noise estimation. For example, UE 115-*c* may transmit or receive data or control signaling to or from base station 105-*e*, respectively, while accounting for the interference. Similarly, base station 105-*e* may transmit or receive data or control signaling to or from UE 115-*c*, respectively, while accounting for the interference.

Figure 4:
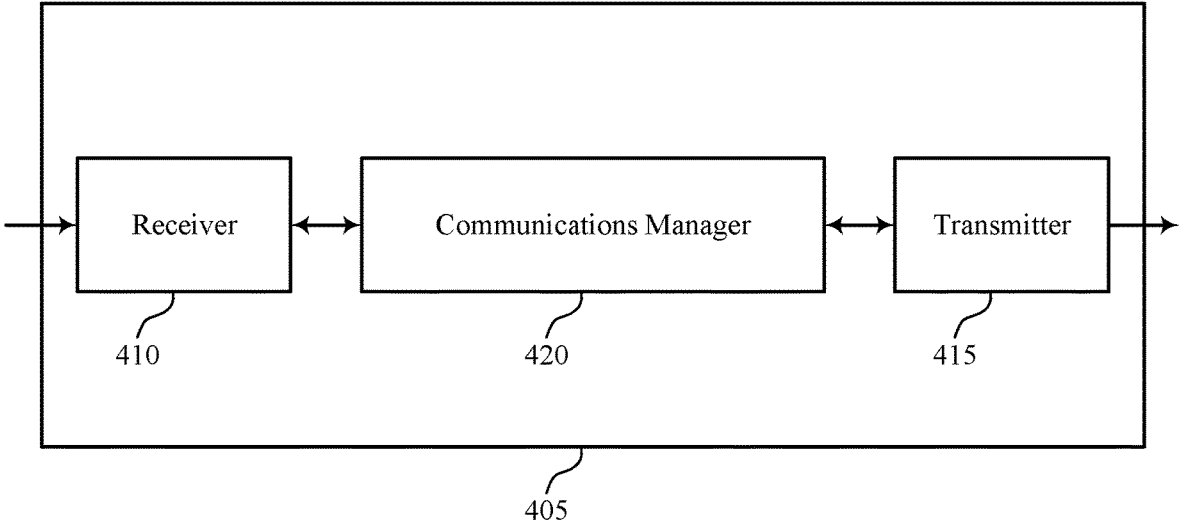
FIGS. 4 and 5 show block diagrams of devices that support interference management for DSS in accordance with aspects of the present disclosure.

FIG. 4 shows a block diagram 400 of a device 405 that supports interference management for DSS in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to interference management for DSS). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to interference management for DSS). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of interference management for DSS as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for identifying a transmission status of a first base station associated with a first RAT, the first base station sharing a portion of a radio frequency spectrum with a second base station in communication with the UE and associated with a second RAT. The communications manager 420 may be configured as or otherwise support a means for measuring an interference associated with the first base station over the portion of the radio frequency spectrum. The communications manager 420 may be configured as or otherwise support a means for updating a noise estimation according to the measured interference and the transmission status of the first base station. The communications manager 420 may be configured as or otherwise support a means for communicating with the second base station according to the updated noise estimation.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for a UE to update a noise estimation (e.g., a noise covariance matrix, a log likelihood ratio (LLR) scaling, or both) for communications with a serving base station to account for interference from a neighboring base station operating according to a different radio access technology (RAT), which may cause reduced processing, reduced power consumption, more efficient utilization of communication resources, and the like.

Figure 5:
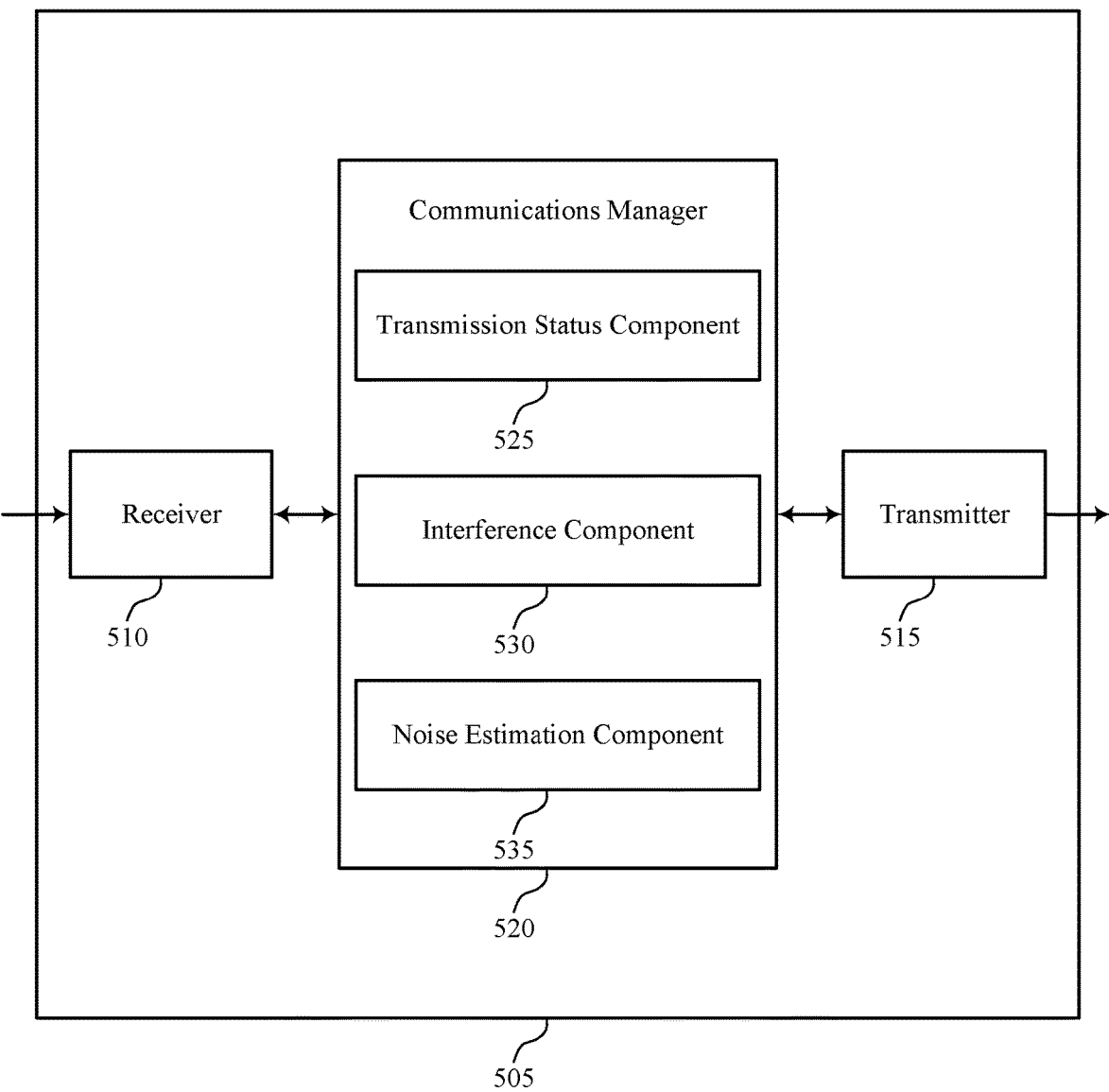

FIG. 5 shows a block diagram 500 of a device 505 that supports interference management for DSS in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to interference management for DSS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to interference management for DSS). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of interference management for DSS as described herein. For example, the communications manager 520 may include a transmission status component 525, an interference component 530, a noise estimation component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The transmission status component 525 may be configured as or otherwise support a means for identifying a transmission status of a first base station associated with a first RAT, the first base station sharing a portion of a radio frequency spectrum with a second base station in communication with the UE and associated with a second RAT. The interference component 530 may be configured as or otherwise support a means for measuring an interference associated with the first base station over the portion of the radio frequency spectrum. The noise estimation component 535 may be configured as or otherwise support a means for updating a noise estimation according to the measured interference and the transmission status of the first base station. The noise estimation component 535 may be configured as or otherwise support a means for communicating with the second base station according to the updated noise estimation.

FIG. 6 shows a block diagram 600 of a communications manager 620 that supports interference management for DSS in accordance with aspects of the present disclosure. The communications manager 620 may be an example of aspects of a communications manager 420, a communications manager 520, or both, as described herein. The communications manager 620, or various components thereof, may be an example of means for performing various aspects of interference management for DSS as described herein. For example, the communications manager 620 may include a transmission status component 625, an interference component 630, a noise estimation component 635, or any combination thereof. Each of these components may communicate, directly or indirectly, with one another (e.g., via one or more buses).

The communications manager 620 may support wireless communications at a UE in accordance with examples as disclosed herein. The transmission status component 625 may be configured as or otherwise support a means for identifying a transmission status of a first base station associated with a first RAT, the first base station sharing a portion of a radio frequency spectrum with a second base station in communication with the UE and associated with a second RAT. The interference component 630 may be configured as or otherwise support a means for measuring an interference associated with the first base station over the portion of the radio frequency spectrum. The noise estimation component 635 may be configured as or otherwise support a means for updating a noise estimation according to the measured interference and the transmission status of the first base station. In some examples, the noise estimation component 635 may be configured as or otherwise support a means for communicating with the second base station according to the updated noise estimation.

In some examples, to support updating the noise estimation, the noise estimation component 635 may be configured as or otherwise support a means for updating a diagonal load in a noise covariance matrix according to a maximum of a default diagonal load and a difference between a first RSRP associated with the first base station and a second RSRP associated with the second base station, where the difference corresponds to the interference.

In some examples, the noise estimation component 635 may be configured as or otherwise support a means for decreasing an LLR scaling for one or more resource elements associated with corresponding reference signals based on the difference.

In some examples, the noise estimation component 635 may be configured as or otherwise support a means for maintaining a diagonal load in a noise covariance matrix. In some examples, the noise estimation component 635 may be configured as or otherwise support a means for decreasing an LLR scaling for one or more resource elements associated with corresponding reference signals based on a difference between a first RSRP associated with the first base station and a second RSRP associated with the second base station, where the difference corresponds to the interference.

In some examples, the LLR scaling is decreased by an amount that is based on a threshold interference associated with the LLR scaling.

In some examples, to support updating the noise estimation, the noise estimation component 635 may be configured as or otherwise support a means for updating a diagonal load in a noise covariance matrix according to a maximum of a default diagonal load and an inverse of an effective SNR, where the effective SNR is based on an allocated MCS associated with the second base station.

In some examples, the transmission status component 625 may be configured as or otherwise support a means for performing, on the portion of the radio frequency spectrum, a cell search procedure and one or more measurements corresponding to the first base station, where identifying the transmission status of the first base station is based on the cell search procedure and performing one or more additional measurements corresponding to the first base station.

In some examples, the one or more additional measurements include channel measurements or signal strength measurements of the first base station.

In some examples, to support identifying the transmission status, the transmission status component 625 may be configured as or otherwise support a means for determining first decoding statistics for a reference signal and second decoding statistics for a data transmission, the first decoding statistics and the second decoding statistics including one or more of a block error rate or a decoding iteration count corresponding to a CB. In some examples, to support identifying the transmission status, the transmission status component 625 may be configured as or otherwise support a means for comparing a difference between the first decoding statistics and the second decoding statistics to determine a presence of a time-localized impact, where the transmission status corresponds to the presence of the time-localized impact.

In some examples, the interference includes reference signal interference.

Figure 7:
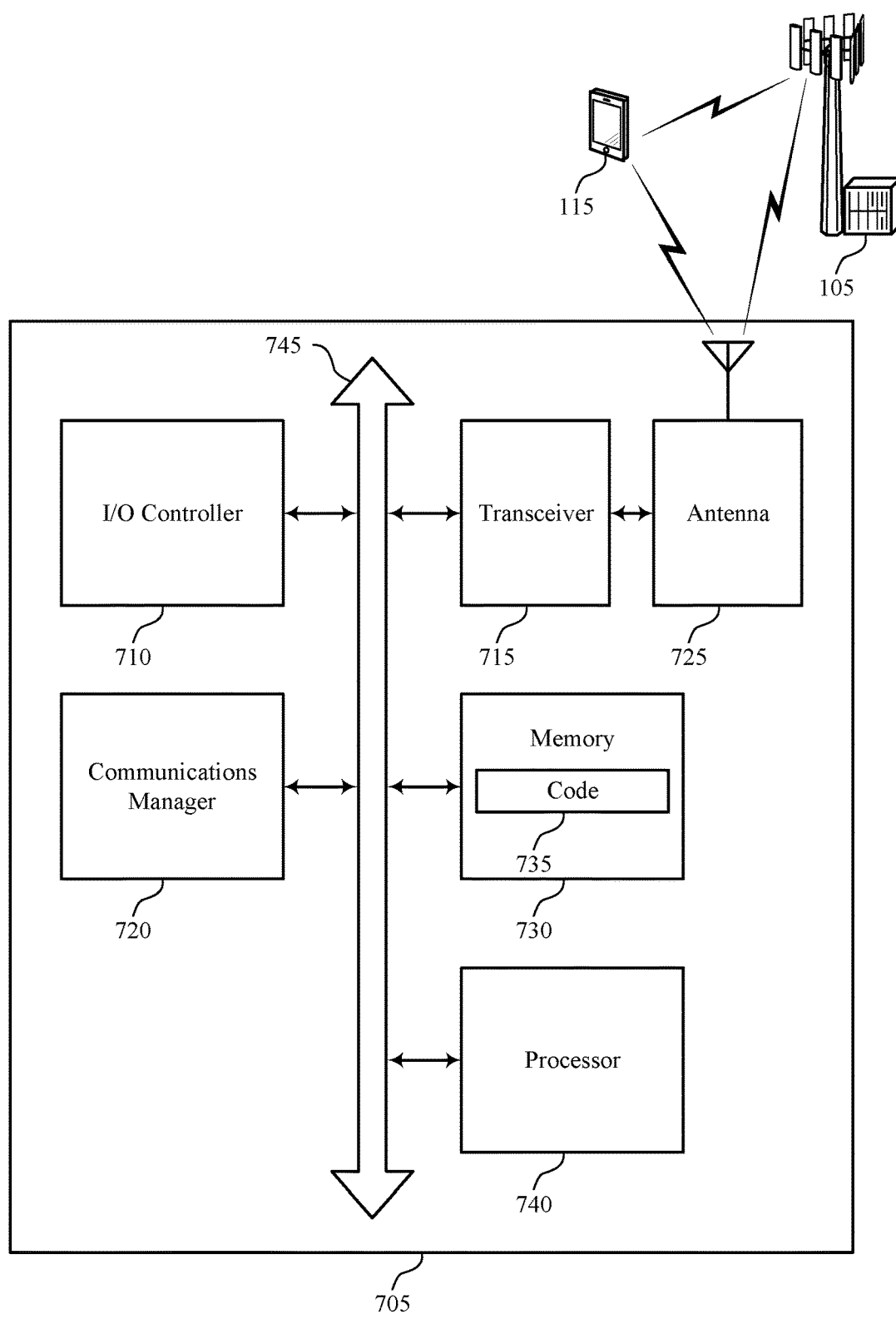
FIG. 7 shows a diagram of a system including a device that supports interference management for DSS in accordance with aspects of the present disclosure.

FIG. 7 shows a diagram of a system 700 including a device 705 that supports interference management for DSS in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting interference management for DSS). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for identifying a transmission status of a first base station associated with a first RAT, the first base station sharing a portion of a radio frequency spectrum with a second base station in communication with the UE and associated with a second RAT. The communications manager 720 may be configured as or otherwise support a means for measuring an interference associated with the first base station over the portion of the radio frequency spectrum. The communications manager 720 may be configured as or otherwise support a means for updating a noise estimation according to the measured interference and the transmission status of the first base station. The communications manager 720 may be configured as or otherwise support a means for communicating with the second base station according to the updated noise estimation.

By including or configuring the communications manager 720 in accordance with examples as described herein, the device 705 may support techniques for a UE to update a noise estimation (e.g., a noise covariance matrix, a log likelihood ratio (LLR) scaling, or both) for communications with a serving base station to account for interference from a neighboring base station operating according to a different radio access technology (RAT), which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of interference management for DSS as described herein, or the processor 740 and the memory 730 may be otherwise configured to perform or support such operations.

FIG. 8 shows a flowchart illustrating a method 800 that supports interference management for DSS in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include identifying a transmission status of a first base station associated with a first RAT, the first base station sharing a portion of a radio frequency spectrum with a second base station in communication with the UE and associated with a second RAT. The operations of 805 may be performed in accordance with examples as disclosed herein. In some examples, aspects of the operations of 805 may be performed by a transmission status component 625 as described with reference to FIG. 6.

At 810, the method may include measuring an interference associated with the first base station over the portion of the radio frequency spectrum. The operations of 810 may be performed in accordance with examples as disclosed herein. In some examples, aspects of the operations of 810 may be performed by an interference component 630 as described with reference to FIG. 6.

At 815, the method may include updating a noise estimation according to the measured interference and the transmission status of the first base station. The operations of 815 may be performed in accordance with examples as disclosed herein. In some examples, aspects of the operations of 815 may be performed by a noise estimation component 635 as described with reference to FIG. 6.

At 820, the method may include communicating with the second base station according to the updated noise estimation. The operations of 820 may be performed in accordance with examples as disclosed herein. In some examples, aspects of the operations of 820 may be performed by a noise estimation component 635 as described with reference to FIG. 6.

FIG. 9 shows a flowchart illustrating a method 900 that supports interference management for DSS in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include identifying a transmission status of a first base station associated with a first RAT, the first base station sharing a portion of a radio frequency spectrum with a second base station in communication with the UE and associated with a second RAT. The operations of 905 may be performed in accordance with examples as disclosed herein. In some examples, aspects of the operations of 905 may be performed by a transmission status component 625 as described with reference to FIG. 6.

At 910, the method may include measuring an interference associated with the first base station over the portion of the radio frequency spectrum. The operations of 910 may be performed in accordance with examples as disclosed herein.

In some examples, aspects of the operations of 910 may be performed by an interference component 630 as described with reference to FIG. 6.

At 915, the method may include updating a noise estimation according to the measured interference and the transmission status of the first base station. The operations of 915 may be performed in accordance with examples as disclosed herein. In some examples, aspects of the operations of 915 may be performed by a noise estimation component 635 as described with reference to FIG. 6.

At 920, the method may include updating a diagonal load in a noise covariance matrix according to a maximum of a default diagonal load and a difference between a first RSRP associated with the first base station and a second RSRP associated with the second base station, where the difference corresponds to the interference. The operations of 920 may be performed in accordance with examples as disclosed herein. In some examples, aspects of the operations of 920 may be performed by a noise estimation component 635 as described with reference to FIG. 6.

At 925, the method may include communicating with the second base station according to the updated noise estimation. The operations of 925 may be performed in accordance with examples as disclosed herein. In some examples, aspects of the operations of 925 may be performed by a noise estimation component 635 as described with reference to FIG. 6.

Figure 10:
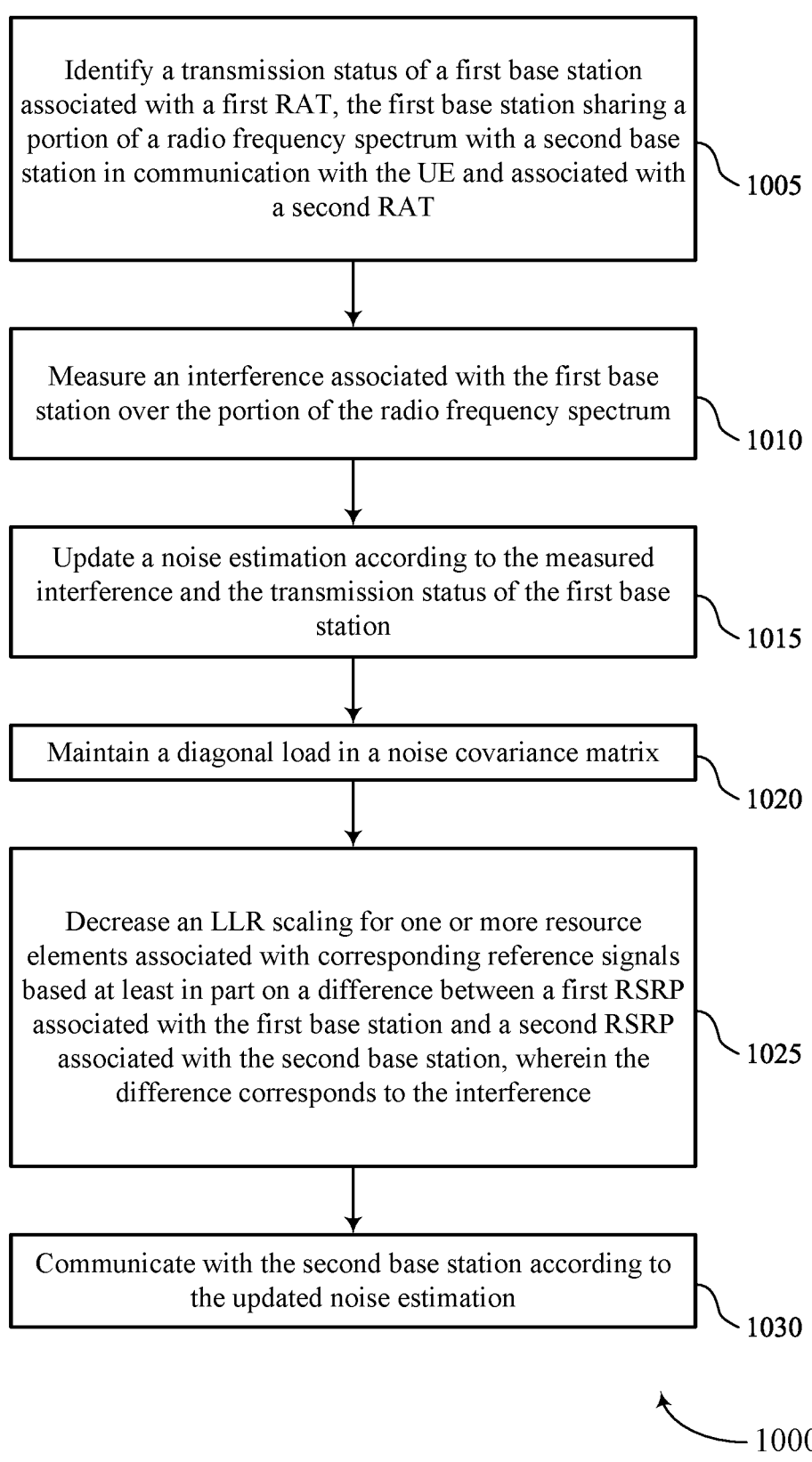

FIG. 10 shows a flowchart illustrating a method 1000 that supports interference management for DSS in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include identifying a transmission status of a first base station associated with a first RAT, the first base station sharing a portion of a radio frequency spectrum with a second base station in communication with the UE and associated with a second RAT. The operations of 1005 may be performed in accordance with examples as disclosed herein. In some examples, aspects of the operations of 1005 may be performed by a transmission status component 625 as described with reference to FIG. 6.

At 1010, the method may include measuring an interference associated with the first base station over the portion of the radio frequency spectrum. The operations of 1010 may be performed in accordance with examples as disclosed herein. In some examples, aspects of the operations of 1010 may be performed by an interference component 630 as described with reference to FIG. 6.

At 1015, the method may include updating a noise estimation according to the measured interference and the transmission status of the first base station. The operations of 1015 may be performed in accordance with examples as disclosed herein. In some examples, aspects of the operations of 1015 may be performed by a noise estimation component 635 as described with reference to FIG. 6.

At 1020, the method may include maintaining a diagonal load in a noise covariance matrix. The operations of 1020 may be performed in accordance with examples as disclosed herein. In some examples, aspects of the operations of 1020 may be performed by a noise estimation component 635 as described with reference to FIG. 6.

At 1025, the method may include decreasing an LLR scaling for one or more resource elements associated with corresponding reference signals based on a difference between a first RSRP associated with the first base station and a second RSRP associated with the second base station, where the difference corresponds to the interference. The operations of 1025 may be performed in accordance with examples as disclosed herein. In some examples, aspects of the operations of 1025 may be performed by a noise estimation component 635 as described with reference to FIG. 6.

At 1030, the method may include communicating with the second base station according to the updated noise estimation. The operations of 1030 may be performed in accordance with examples as disclosed herein. In some examples, aspects of the operations of 1030 may be performed by a noise estimation component 635 as described with reference to FIG. 6.

FIG. 11 shows a flowchart illustrating a method 1100 that supports interference management for DSS in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1105, the method may include identifying a transmission status of a first base station associated with a first RAT, the first base station sharing a portion of a radio frequency spectrum with a second base station in communication with the UE and associated with a second RAT. The operations of 1105 may be performed in accordance with examples as disclosed herein. In some examples, aspects of the operations of 1105 may be performed by a transmission status component 625 as described with reference to FIG. 6.

At 1110, the method may include measuring an interference associated with the first base station over the portion of the radio frequency spectrum. The operations of 1110 may be performed in accordance with examples as disclosed herein. In some examples, aspects of the operations of 1110 may be performed by an interference component 630 as described with reference to FIG. 6.

At 1115, the method may include updating a noise estimation according to the measured interference and the transmission status of the first base station. The operations of 1115 may be performed in accordance with examples as disclosed herein. In some examples, aspects of the operations of 1115 may be performed by a noise estimation component 635 as described with reference to FIG. 6.

At 1120, the method may include updating a diagonal load in a noise covariance matrix according to a maximum of a default diagonal load and an inverse of an effective SNR, where the effective SNR is based on an allocated MCS associated with the second base station. The operations of 1120 may be performed in accordance with examples as disclosed herein. In some examples, aspects of the operations of 1120 may be performed by a noise estimation component 635 as described with reference to FIG. 6.

At 1125, the method may include communicating with the second base station according to the updated noise estimation. The operations of 1125 may be performed in accordance with examples as disclosed herein. In some examples, aspects of the operations of 1125 may be performed by a noise estimation component 635 as described with reference to FIG. 6.

The following provides an overview of aspects of the present disclosure:

Aspect 1: A method for wireless communications at a UE, comprising: identifying a transmission status of a first base station associated with a first radio access technology, the first base station sharing a portion of a radio frequency spectrum with a second base station in communication with the UE and associated with a second radio access technology; measuring an interference associated with the first base station over the portion of the radio frequency spectrum; updating a noise estimation according to the measured interference and the transmission status of the first base station; and communicating with the second base station according to the updated noise estimation.

Aspect 2: The method of aspect 1, wherein updating the noise estimation comprises: updating a diagonal load in a noise covariance matrix according to a maximum of a default diagonal load and a difference between a first reference signal received power associated with the first base station and a second reference signal received power associated with the second base station, wherein the difference corresponds to the interference.

Aspect 3: The method of aspect 2, further comprising: decreasing a log likelihood ratio scaling for one or more resource elements associated with corresponding reference signals based at least in part on the difference.

Aspect 4: The method of aspect 1, further comprising: maintaining a diagonal load in a noise covariance matrix; and decreasing a log likelihood ratio scaling for one or more resource elements associated with corresponding reference signals based at least in part on a difference between a first reference signal received power associated with the first base station and a second reference signal received power associated with the second base station, wherein the difference corresponds to the interference.

Aspect 5: The method of aspect 4, wherein the log likelihood ratio scaling is decreased by an amount that is based at least in part on a threshold interference associated with the log likelihood ratio scaling.

Aspect 6: The method of any of aspects 1 through 5, wherein updating the noise estimation comprises: updating a diagonal load in a noise covariance matrix according to a maximum of a default diagonal load and an inverse of an effective signal-to-noise ratio, wherein the effective signal-to-noise ratio is based at least in part on an allocated modulation and coding scheme associated with the second base station.

Aspect 7: The method of any of aspects 1 through 6, further comprising: performing, on the portion of the radio frequency spectrum, a cell search procedure and one or more measurements corresponding to the first base station, wherein identifying the transmission status of the first base station is based at least in part on the cell search procedure and performing one or more additional measurements corresponding to the first base station.

Aspect 8: The method of aspect 7, wherein the one or more additional measurements comprise channel measurements or signal strength measurements of the first base station.

Aspect 9: The method of any of aspects 1 through 8, wherein identifying the transmission status comprises: determining first decoding statistics for a reference signal and second decoding statistics for a data transmission, the first decoding statistics and the second decoding statistics comprising one or more of a block error rate or a decoding iteration count corresponding to a code block; and comparing a difference between the first decoding statistics and the second decoding statistics to determine a presence of a time-localized impact, wherein the transmission status corresponds to the presence of the time-localized impact.

Aspect 10: The method of any of aspects 1 through 9, wherein the interference includes reference signal interference.

Aspect 11: An apparatus for wireless communications at a UE, comprising a processor; memory coupled with the processor; and instructions stored in the memory and executable by the processor to cause the apparatus to perform a method of any of aspects 1 through 10.

Aspect 12: An apparatus for wireless communications at a UE, comprising at least one means for performing a method of any of aspects 1 through 10.

Aspect 13: A non-transitory computer-readable medium storing code for wireless communications at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

comparing first decoding statistics for a reference signal and second decoding statistics for a data transmission corresponding to a time-localized impact, a result of the comparison indicating that a first network entity associated with a first radio access technology is unloaded, the first decoding statistics and the second decoding statistics comprising one or more of a block error rate or a decoding iteration count corresponding to a code block;

measuring, based at least in part on the first network entity associated with the first radio access technology being unloaded, an interference associated with the first network entity over a portion of a radio frequency spectrum that is shared with a second network entity in communication with the UE and associated with a second radio access technology;

updating, for one or more resource elements corresponding to the interference associated with the first network entity, a diagonal load in a noise covariance matrix according to a higher value between a default diagonal load, a difference between a first reference signal received power associated with the first network entity and a second reference signal received power associated with the second network entity, and an inverse of an effective signal-to-noise ratio, the effective signal-to-noise ratio based at least in part on an allocated modulation and coding scheme associated with the second network entity, and the updating based at least in part on the measured interference and the first network entity being unloaded; and communicating with the second network entity based at least in part on updating the diagonal load in the noise covariance matrix.

2. The method of claim 1, further comprising:

decreasing a log likelihood ratio scaling for one or more resource elements associated with corresponding reference signals based at least in part on the difference.

3. The method of claim 1, further comprising:

decreasing a log likelihood ratio scaling for the one or more resource elements associated with corresponding reference signals based at least in part on the difference between the first reference signal received power associated with the first network entity and the second reference signal received power associated with the second network entity, wherein the difference corresponds to the interference.

4. The method of claim 3, wherein the log likelihood ratio scaling is decreased by an amount that is based at least in part on a threshold interference associated with the log likelihood ratio scaling.

5. The method of claim 1, wherein the interference includes reference signal interference.

6. An apparatus for wireless communications at a user equipment (UE), comprising:

one or more memories storing processor-executable code; and one or more processors coupled with the one or more memories and operable to execute the code to cause the apparatus to:

compare first decoding statistics for a reference signal and second decoding statistics for a data transmission corresponding to a time-localized impact, a result of the comparison indicating that a first network entity associated with a first radio access technology is unloaded, the first decoding statistics and the second decoding statistics comprising one or more of a block error rate or a decoding iteration count corresponding to a code block;

measure, based at least in part on the first network entity associated with the first radio access technology being unloaded, an interference associated with the first network entity over a portion of a radio frequency spectrum that is shared with a second network entity in communication with the UE and associated with a second radio access technology;

update, for one or more resource elements corresponding to the interference associated with the first network entity, a diagonal load in a noise covariance matrix according to a higher value between a default diagonal load, a difference between a first reference signal received power associated with the first network entity and a second reference signal received power associated with the second network entity, and an inverse of an effective signal-to-noise ratio, the effective signal-to-noise ratio based at least in part on an allocated modulation and coding scheme associated with the second network entity, and the updating based at least in part on the measured interference and the first network entity being unloaded; and communicate with the second network entity based at least in part on updating the diagonal load in the noise covariance matrix.

7. The apparatus of claim 6, wherein the one or more processors are further operable to cause the apparatus to:

decrease a log likelihood ratio scaling for one or more resource elements associated with corresponding reference signals based at least in part on the difference.

8. The apparatus of claim 6, wherein the one or more processors are further operable to cause the apparatus to:

decrease a log likelihood ratio scaling for the one or more resource elements associated with corresponding reference signals based at least in part on the difference between the first reference signal received power associated with the first network entity and the second reference signal received power associated with the second network entity, wherein the difference corresponds to the interference.

9. The apparatus of claim 8, wherein the log likelihood ratio scaling is decreased by an amount that is based at least in part on a threshold interference associated with the log likelihood ratio scaling.

10. The apparatus of claim 6, wherein:

the interference includes reference signal interference.

11. A non-transitory computer-readable medium storing code for wireless communications at a user equipment (UE), the code comprising instructions executable by one or more processors to:

compare first decoding statistics for a reference signal and second decoding statistics for a data transmission corresponding to a time-localized impact, a result of the comparison indicating that a first network entity associated with a first radio access technology is unloaded, the first decoding statistics and the second decoding statistics comprising one or more of a block error rate or a decoding iteration count corresponding to a code block;

measure, based at least in part on the first network entity associated with the first radio access technology being unloaded, an interference associated with the first network entity over a portion of a radio frequency spectrum that is shared with a second network entity in communication with the UE and associated with a second radio access technology;

update, for one or more resource elements corresponding to the interference associated with the first network entity, a diagonal load in a noise covariance matrix according to a higher value between a default diagonal load, a difference between a first reference signal received power associated with the first network entity and a second reference signal received power associated with the second network entity, and an inverse of an effective signal-to-noise ratio, the effective signal-to-noise ratio based at least in part on an allocated modulation and coding scheme associated with the second network entity, and the updating based at least in part on the measured interference and the first network entity being unloaded; and communicate with the second network entity based at least in part on updating the diagonal load in the noise covariance matrix.

12. The non-transitory computer-readable medium of claim 11, wherein the instructions are further executable by the one or more processors to:

decrease a log likelihood ratio scaling for one or more resource elements associated with corresponding reference signals based at least in part on the difference.

13. The non-transitory computer-readable medium of claim 11, wherein the instructions are further executable by the one or more processors to:

decrease a log likelihood ratio scaling for the one or more resource elements associated with corresponding reference signals based at least in part on the difference between the first reference signal received power associated with the first network entity and the second reference signal received power associated with the second network entity, wherein the difference corresponds to the interference.

14. The non-transitory computer-readable medium of claim 13, wherein the log likelihood ratio scaling is decreased by an amount that is based at least in part on a threshold interference associated with the log likelihood ratio scaling.

15. An apparatus for wireless communications at a user equipment (UE), comprising:

means for comparing first decoding statistics for a reference signal and second decoding statistics for a data transmission corresponding to a time-localized impact, a result of the comparison indicating that a first network entity associated with a first radio access technology is unloaded, the first decoding statistics and the second decoding statistics comprising one or more of a block error rate or a decoding iteration count corresponding to a code block;

means for measuring, based at least in part on the first network entity associated with the first radio access technology being unloaded, an interference associated with the first network entity over a portion of a radio frequency spectrum that is shared with a second network entity in communication with the UE and associated with a second radio access technology;

means for updating, for one or more resource elements corresponding to the interference associated with the first network entity, a diagonal load in a noise covariance matrix according to a higher value between a default diagonal load, a difference between a first reference signal received power associated with the first network entity and a second reference signal received power associated with the second network entity, and an inverse of an effective signal-to-noise ratio, the effective signal-to-noise ratio based at least in part on an allocated modulation and coding scheme associated with the second network entity, and the updating based at least in part on the measured interference and the first network entity being unloaded; and means for communicating with the second network entity based at least in part on updating the diagonal load in the noise covariance matrix.

16. The apparatus of claim 15, further comprising:

means for decreasing a log likelihood ratio scaling for one or more resource elements associated with corresponding reference signals based at least in part on the difference.

17. The apparatus of claim 15, further comprising:

means for decreasing a log likelihood ratio scaling for the one or more resource elements associated with corresponding reference signals based at least in part on the difference between the first reference signal received power associated with the first network entity and the second reference signal received power associated with the second network entity, wherein the difference corresponds to the interference.

18. The apparatus of claim 17, wherein the log likelihood ratio scaling is decreased by an amount that is based at least in part on a threshold interference associated with the log likelihood ratio scaling.

* * * * *